(12) United States Patent
Johnson et al.

(10) Patent No.: US 7,853,384 B2
(45) Date of Patent: Dec. 14, 2010

(54) METHOD AND SYSTEM FOR CONTROLLING A VEHICLE FOR LOADING OR DIGGING MATERIAL

(75) Inventors: David August Johnson, Moline, IL (US); Mark Peter Sahlin, Bettendorf, IA (US); Eric Richard Anderson, Galena, IL (US); Mark John Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 721 days.

(21) Appl. No.: 11/782,343

(22) Filed: Jul. 24, 2007

(65) Prior Publication Data
US 2008/0234901 A1  Sep. 25, 2008

Related U.S. Application Data

(60) Provisional application No. 60/895,808, filed on Mar. 20, 2007.

(51) Int. Cl.
  B60T 7/12    (2006.01)
  G05D 1/00    (2006.01)
  G06F 7/00    (2006.01)
  G06F 17/00   (2006.01)
(52) U.S. Cl. .................. 701/50; 701/91; 37/414
(58) Field of Classification Search .................. None
  See application file for complete search history.

(56) References Cited

U.S. PATENT DOCUMENTS

| 3,643,828 A | 2/1972 | Elliott |
| 3,782,572 A | 1/1974 | Gautier |
| 5,000,650 A | 3/1991 | Brewer et al. |
| 5,493,798 A | 2/1996 | Rocke et al. |
| 5,528,843 A | 6/1996 | Rocke |
| 5,968,103 A | 10/1999 | Rocke |
| 5,974,352 A | 10/1999 | Shull |
| 6,064,933 A | 5/2000 | Rocke |
| 6,205,687 B1 | 3/2001 | Rocke |
| 6,211,471 B1 | 4/2001 | Rocke et al. |
| 6,234,254 B1 | 5/2001 | Dietz et al. |
| 6,321,153 B1 | 11/2001 | Rocke et al. |
| 6,496,766 B1 | 12/2002 | Bernold et al. |
| 6,879,899 B2 | 4/2005 | Budde |
| 2001/0056319 A1 | 12/2001 | Rocke |

OTHER PUBLICATIONS

USPTO Office Action for U.S. Appl. No. 11/782,367 dated Jul. 19, 2010.

*Primary Examiner*—Michael J. Zanelli
(74) *Attorney, Agent, or Firm*—Yee & Associates, P.C.; Dawn C. Wolff (57) ABSTRACT

A method and system for controlling a vehicle comprises a torque detector for detecting a first torque level and a second torque level applied to at least one wheel of the vehicle. The first torque level is associated with a lower boom position of a boom and a second torque level is associated with an elevated boom position higher than the lower boom position. A first hydraulic cylinder is capable of raising a boom from the lower boom position to raise an available torque from the first torque level. A second hydraulic cylinder is adapted to upwardly rotate or curl a bucket associated with the vehicle when the detected second torque level meets or exceeds a second torque threshold, for example.

22 Claims, 9 Drawing Sheets

Fig. 10

METHOD AND SYSTEM FOR CONTROLLING A VEHICLE FOR LOADING OR DIGGING MATERIAL

This document (including the drawings) claims priority based on U.S. provisional application No. 60/895,808, filed on Mar. 20, 2007 and entitled, METHOD AND SYSTEM FOR CONTROLLING A VEHICLE FOR LOADING OR DIGGING MATERIAL, under 35 U.S.C. 119(e).

FIELD OF THE INVENTION

This invention relates to a method and system for controlling a vehicle for loading or digging material.

BACKGROUND OF THE INVENTION

An operator's performance may vary based on an operator's level of skill, experience, fatigue, and attentiveness, among other things. For example, for loaders, or other vehicles for loading or digging material, a novice operator may move or manipulate materials less efficiently than an experienced operator would. Accordingly, there is a need for augmenting or enhancing an operator's performance (particularly a novice operator) by controlling a vehicle for loading or digging material.

SUMMARY OF THE INVENTION

A method and system for controlling a vehicle comprises a torque detector for detecting a first torque level and a second torque level applied to at least one wheel of the vehicle. The first torque level is associated with a lower boom position of a boom and a second torque level is associated with an elevated boom position higher than the lower boom position. A first hydraulic cylinder is capable of raising a boom from the lower boom position to raise an available torque from the first torque level. A second hydraulic cylinder is adapted to upwardly rotate or curl a bucket associated with the vehicle when the detected second torque level meets or exceeds a second torque threshold, for example.

DESCRIPTION OF THE PREFERRED EMBODIMENT

Rimpull is the force or torque available between the wheel (e.g., tire) and the ground (or other surface) to move the vehicle or to push the vehicle into a pile of material. Rimpull is limited by traction of the wheel (e.g., 254 in FIG. 5) or tire with respect to the ground or other surface. The value of rimpull or a torque level indicates how hard the vehicle is pushing or pulling. For a loader, the loader may push into a pile of material during digging or another operation in which a bucket (e.g., 251 in FIG. 5) is filled with material.

Figure 1:
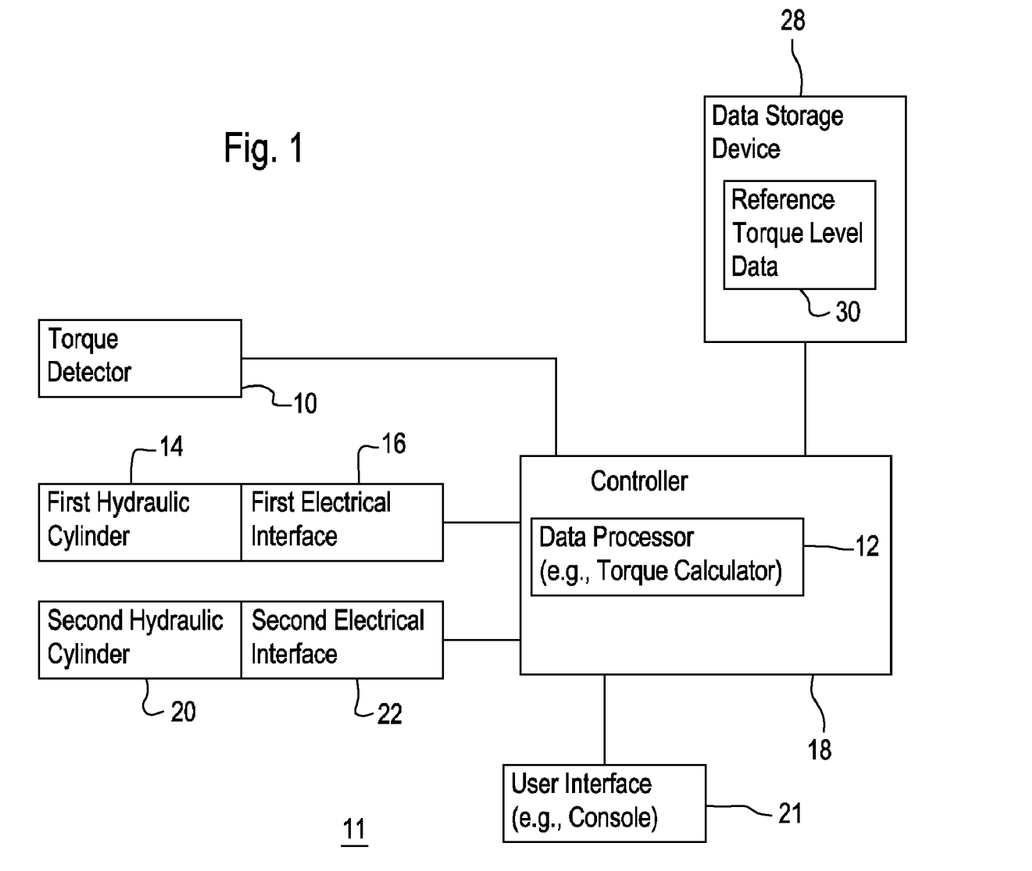
FIG. 1 is a block diagram of a first embodiment of a control system for controlling a vehicle for loading or digging.

In accordance with one embodiment, the system of FIG. 1 comprises a torque detector 10 that is coupled to a controller 18. The controller 18 supports the input of data from a user interface 21, the output of data to the user interface 21, or both. The controller 18 is coupled to a data storage device 28. The controller 18 may communicate with a first electrical interface 16, a second electrical interface 22, or both. The first electrical interface 16 is associated with the first hydraulic cylinder 14, whereas the second electrical interface 22 is associated with the second hydraulic cylinder 20.

The lines in FIG. 1 that interconnect the foregoing components (10, 16, 21, 22 and 28) to the controller 18 may represent one or more physical communication paths, logical communication paths, or both. For example, multiple logical communication paths may be implemented over a single data-bus or physical communication path that connects the controller 18 with the foregoing components.

The torque detector 10 comprises a torque sensor or a torque transducer for detecting or estimating the rimpull or torque level associated with one or more wheels of the vehicle. In one configuration, the torque detector 10 comprises a sensor input shaft and a sensor output shaft, where a transducer, a strain gauge, piezoelectric member, or piezoresistive member is coupled or connected between the sensor input shaft and the sensor output shaft. The strain gauge or piezoresistive member may change an electrical property (e.g., resistance or reactance) in response to torque applied between the sensor input shaft and the sensor output shaft. Similarly, the piezoelectric member may change an electrical property or generate electrical energy upon deformation of the member associated with the application of torque between the sensor input shaft and the sensor output shaft. The sensor output may provide a torque signal or torque data. In one embodiment, the transducer, the strain gauge, piezoresistive member, or piezoelectric member is coupled to an analog-to-digital converter to provide a digital output signal indicative of torque.

The torque detector 10 may be mounted anywhere in the drivetrain to directly or indirectly determine or estimate the torque associated with one or more wheels of the vehicle. Under a first example, the torque detector is associated with a transmission of a vehicle, a torque converter of the vehicle, a drivetrain of the vehicle, a drive motor of the vehicle, or a crank shaft of the vehicle. In some configurations, the torque applied to one or more wheels is generally proportional to the torque measured at the transmission, drivetrain, or crankshaft of the vehicle. For example, the torque detector 10 may be associated with a torque converter input shaft, a torque converter's output shaft, or both, where the torque converter is coupled to a transmission input or input shaft. Because the torque detector 10 uses a strain gauge, a piezoelectric member or a piezoresistive member, the torque measurement or observed torque level is generally independent of changes in the temperature of the vehicle (or the ambient temperature). Advantageously, the torque detector 10 does not rely upon measurements of hydraulic flow or pressure, which may vary materially as the vehicle warms up or otherwise over time.

Under a second example, a sensor input shaft of the torque detector 10 may be associated with or coupled to a drive motor (e.g., electric hub motor, a driven shaft associated with a wheel, or a differential shaft). Accordingly, the sensor output shaft may of the torque detector 10 be associated with the wheel or a hub of the wheel.

In an alternative embodiment, the torque detector 10 or torque sensor may comprise a magnetic transducer, the combination of a magnetic sensor and a one or more magnets, and the combination of a magneto-restrictive sensor and one or more magnets. For instance, one or more magnetic members are secured to a wheel, a hub or the wheel, a wheel shaft, or a driven shaft, where a transducer, magnetorestrictive sensor, or a magnetic sensor device is spaced apart from the magnetic member or members. The transducer, magneto-restrictive sensor, or a magnetic sensor measures a change in the magnetic field produced by the magnetic members as the shaft rotates to estimate torque, shaft velocity, wheel rotational velocity (e.g., speed), or any combination of the foregoing parameters.

The user interface 21 comprises a switch, a joystick, a keypad, a control panel, a keyboard, a pointing device (e.g., mouse or trackball) or another device that supports the operator's input and/or output of information from or to the control system 11.

The data storage device 28 may comprise memory, non-volatile memory, magnetic storage, optical storage, or electronic storage for storing reference torque level data 30 or rimpull data. The reference torque level 30 data may comprise one or more torque thresholds, or maximum torque levels that are used to make decisions regarding the first hydraulic cylinder 14, the second hydraulic cylinder 20, or both.

The controller 18 may comprise a data processor (e.g., 12), a microcontroller, a microprocessor, a digital signal processor, a logic circuit, a programmable logic array, or another device for controlling the control system 11 in response to one or more of the following: user input data, detected torque data, vehicle ground speed data, boom acceleration data, and stored data associated with the data storage device 28. In one embodiment, the controller 18 may comprise a data processor 12 or torque calculator. The data processor 12 may comprise a torque calculator for estimating the torque applied to one or more wheels of a vehicle. For example, the data processor 12 may estimate a torque level or rimpull based on one or more samples, readings, or measurements from the torque detector 10. The torque level at one or more wheels may be derived or estimated from a torque level at a torque converter, a transmission shaft, or a crankshaft of an engine that indirectly or directly provides rotational energy to one or more wheels. For instance, the gear ratio of the transmission, the gear ratios of one or more active gears therein, or another device for transmitting mechanical energy (e.g., rotational movement) may be considered when estimating a wheel torque level or rimpull from a remote torque level associated with a torque converter, a transmission shaft, or a crankshaft of an engine. The torque detector 10 provides samples, readings or measurements to the controller 18 or the data processor 12. The data processor 12 may access a look-up table, an equation, a formula, or an algorithm for converting one or more readings or measurements into a corresponding torque level, torque data, or torque signal. Further, the controller 18 may communicate with a transmission controller (e.g., via a databus) to identify the active gears or current gear ratio status of the transmission during operation of the vehicle.

The controller 18 manages storage, retrieval or accessing of reference torque level data 30 stored in a data storage device 28. For example, the data storage device 28 may store a first threshold torque level (e.g., a maximum torque level for a lowered boom state or preliminary boom position), a second threshold torque level (e.g., a maximum torque level for an elevated boom state or a secondary boom position), and a minimum acceleration level. In response to the receipt of control data or control signals from the user interface 21 and torque data or rimpull data from the torque detector 10, the controller 18 may access or retrieve reference torque level data 30 from the data storage device 28. In turn, the controller 18 uses the detected torque data (or observed rimpull data) and reference torque level 30 data 30 to determine appropriate control signals for the first electrical interface 16, the second electrical interface 22, or both. In one embodiment, the control signals or control data may have a magnitude (e.g., electrical value) that is proportional to a size, amount, or duration of a valve opening associated with one or more of the following: first electrical interface 16, a second electrical interface 22, a first hydraulic cylinder 14 or a second hydraulic cylinder 20. For instance, the larger the opening of the valve of the first hydraulic cylinder 14 or the second hydraulic cylinder 20, the higher the rate of movement (e.g. joint rotation) of the bucket 251 or the boom 252.

The first electrical interface 16 may comprise an actuator, a solenoid, a relay, a servo-motor, or an electrically or electronically controlled valve, or another electromechanical device for controlling a hydraulic valve or hydraulic flow of hydraulic fluid associated with the first hydraulic cylinder 14. The first electrical interface 16 facilitates control of the movement (e.g., movement rate) or position of a first movable member (e.g., a hydraulic cylinder) associated with the first hydraulic cylinder 14. In one embodiment, the first hydraulic cylinder is mechanically coupled to a boom of the vehicle to control movement (e.g., boom height) of the boom.

The second electrical interface 22 may comprise an actuator, a solenoid, a relay, a servo-motor, or an electrically or electronically controlled valve, or another electromechanical device for controlling a hydraulic valve or hydraulic flow associated with the second hydraulic cylinder 20. The second electrical interface 22 facilitates control of the movement (e.g., movement rate) or position of a second movable member (e.g., a hydraulic piston) associated with the second hydraulic cylinder 20. In one embodiment, the second hydraulic cylinder 20 is mechanically coupled to a bucket or attachment of the vehicle to control movement (e.g., curl) of the bucket or attachment. As the torque detector 10 detects increased torque level (e.g., rimpull), the controller 18 may proportionally increase the rate of movement of the bucket (e.g., by increasing hydraulic flow of fluid to a chamber within the second hydraulic cylinder 20).

In one illustrative embodiment, the controller 18 is adapted to programmed to send first control data or a first control signal (to the first electrical interface 16) for controlling the first hydraulic cylinder 14 to raise the boom if the first torque level exceeds a first threshold. The controller 18 is adapted to or programmed to send second control data or a second control signal (to the second electrical interface 22) to upwardly rotate the bucket, via the second hydraulic cylinder 20, if the detected second torque level meets or exceeds a second torque level.

In another illustrative embodiment, the controller 18 is adapted to or programmed to send first control data or a first control signal (to the first electrical interface 16) for controlling the first hydraulic cylinder 14 to raise the boom if the first torque level exceeds a first threshold, Further, the controller 18 is adapted to or programmed to send second control data or a second control signal (to the second electrical interface 22) to upwardly rotate the bucket, via the second hydraulic cylinder 20, if the detected acceleration level of the boom is less than a minimum level during an attempt to raise the boom.

Figure 2:
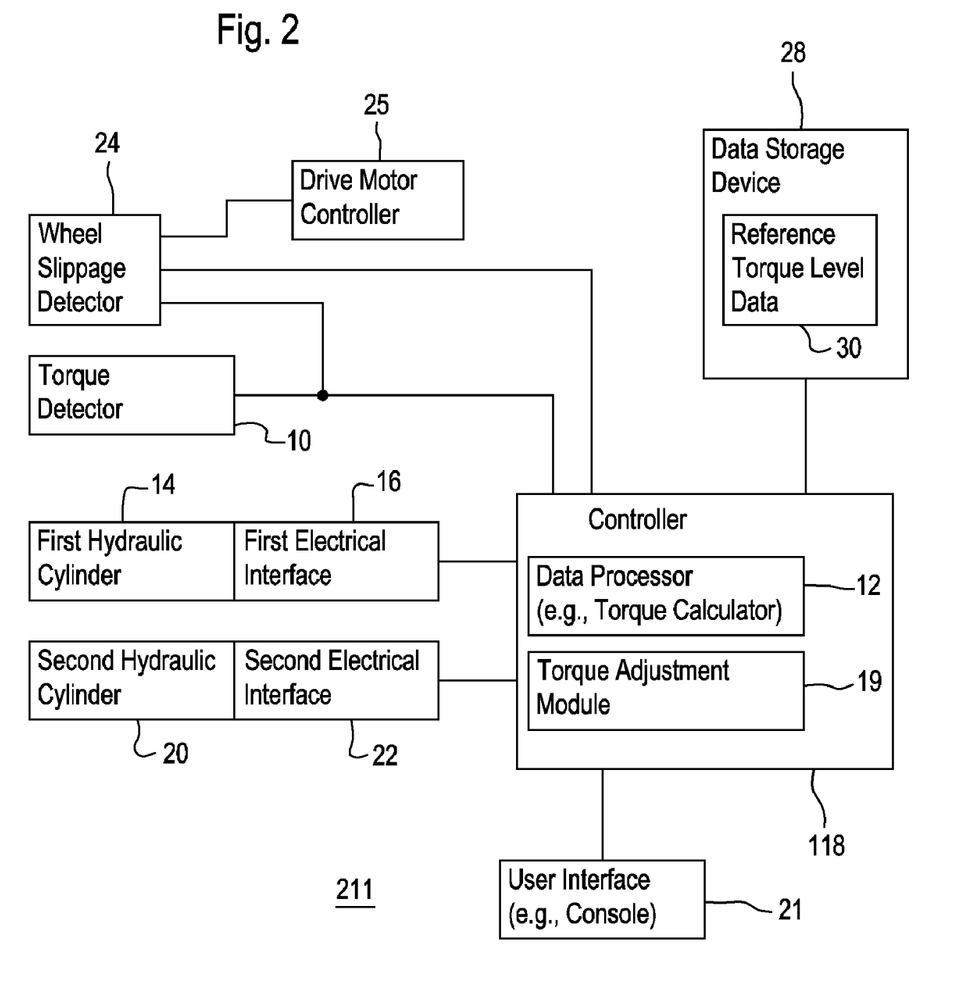
FIG. 2 is a block diagram of a second embodiment of a control system for controlling a vehicle for loading or digging.

The control system 111 of FIG. 2 is similar to the control system 11 of FIG. 1, except the control system 111 of FIG. 2 further comprises a wheel slippage detector 24, a drive motor controller 25, and a torque adjustment module 19. Like reference numbers in FIG. 1 and FIG. 2 indicate like elements.

The wheel slippage detector 24 detects slippage of one or more wheels of the vehicle relative to the ground or another surface upon which the wheels rest. The drive motor controller 25 provides a motor control signal or motor data (e.g., motor shaft speed data or associated motor torque data) to the wheel slippage detector 24, whereas the torque detector 10 provides detected torque associated with one or more wheels. The wheel slippage detector 24 detects wheel slippage if the instantaneous motor torque data differs (e.g., commanded by the motor control signal or data) from the estimated or detected instantaneous torque (e.g., detected or estimated rimpull) by a material differential (e.g., less mechanical and friction losses within the vehicle transmission system). In the alternative embodiment, the wheel slippage detector 24 may detect wheel slippage based on a difference between instantaneous velocity of a wheel (or an associated shaft) and instantaneous velocity applied by a drive motor or engine.

The controller 118 of FIG. 2 is similar to the controller 18 of FIG. 1, except the controller 118 further includes a torque adjustment module 19. The controller 118 of FIG. 2 comprises a data processor 12 (e.g., torque calculator) and a torque adjustment module 19. The torque adjustment module 19 or controller 118 may respond to detected wheel slippage in accordance with various techniques that may be applied alternately or cumulatively. Under a first technique, the torque adjustment module 19 varies the motor control signal or motor data (e.g., motor shaft speed data or associated motor torque data) in response to material detected wheel slippage. Under a second technique, the torque adjustment module 19 decreases the reference torque level data 30 (or various torque thresholds (e.g., a first torque threshold, a second torque threshold, or both) that are used to control the bucket, the boom, or both) in response to wheel slippage. The torque adjustment module 19 may compensate for wheel slippage where a typical or an assumed degree of traction may not be present on the ground or surface on which the vehicle is currently operating, for instance. The torque adjustment module 19 is responsible for communicating the degree of torque adjustment of reference torque levels 30 to compensate for the detected wheel slippage by referencing an equation, a look-up table, a chart, a database, or another data structure, which may be stored in a data storage device 28.

Under a third technique, the torque adjustment module 19 may provide reference torque level data 30 to a motor drive controller 25 such that the motor drive controller 25 can retard the applied rotational energy to prevent wheel slippage or to otherwise maximize the amount of push into the pile of material to be moved or dug.

Figure 3:
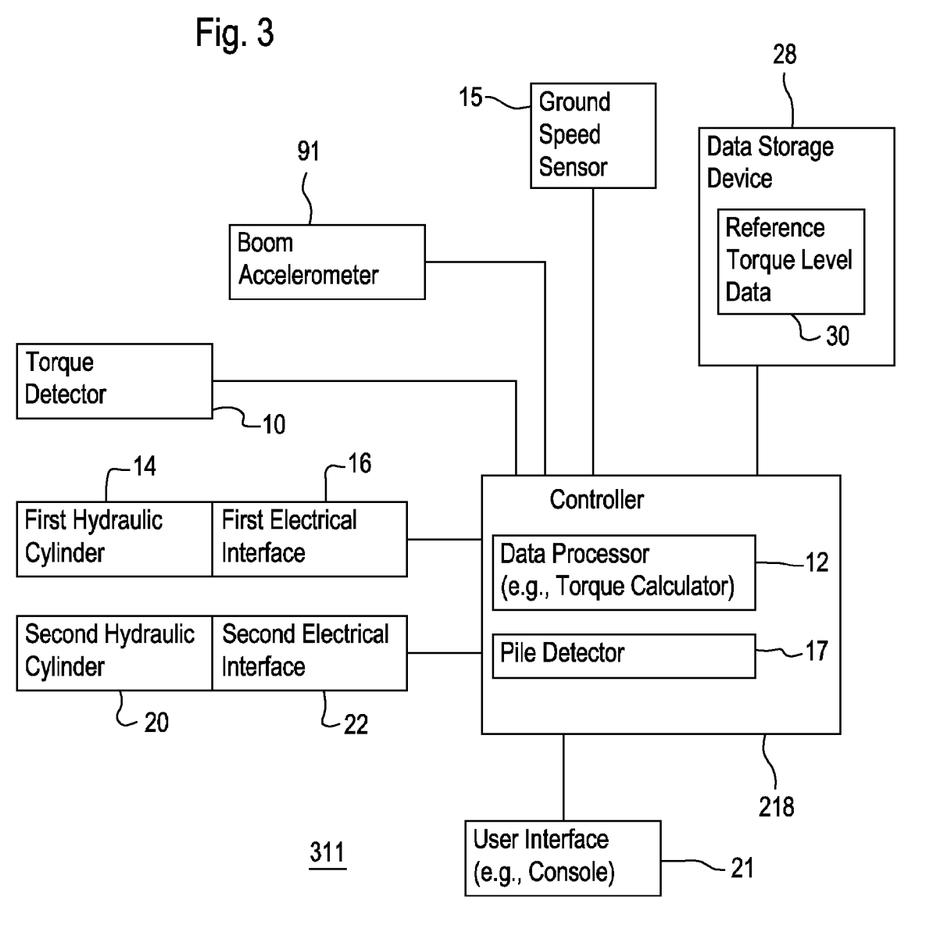
FIG. 3 is a block diagram of a third embodiment of a control system for controlling a vehicle for loading or digging.

The control system 211 of FIG. 3 is similar to the system 11 of FIG. 1, except the control system 211 of FIG. 3 further comprises a ground speed sensor 15, a pile detector 17, and a boom accelerometer 91. Like reference numbers in FIG. 3 and FIG. 1 indicate like elements.

The ground speed sensor 15 may comprise an odometer, a dead-reckoning system, a location-determining receiver (e.g., Global Positioning System receiver), or another device that provides the observed speed or observed velocity of the vehicle with respect to the ground. The ground speed sensor 15 provides observed speed data or observed velocity data to the controller 18.

The controller 218 of FIG. 3 is similar to the controller 18 of FIG. 1, except the controller 218 further includes the pile detector 17. The controller 218 of FIG. 3 comprises a data processor 12 (e.g., torque calculator) and a pile detector 17. In one embodiment, the pile detector 17 or controller 218 uses at least inputted ground speed data and observed torque data to determine whether the vehicle is interacting with or digging into a pile of material (e.g., dirt, subsoil, clay, gravel, sand, debris, soil, building materials, road materials, or construction materials). Further, the pile detector 17 or controller 218 may use user input data (e.g., activation of a switch or control, indicating an auto-dig mode, an assist mode, or an automated machine movement mode), observed ground speed data, and observed torque data to determine whether the vehicle is interacting with or digging into a pile. In one embodiment, the pile detector 17 determines whether or not a pile of material is considered potentially present in a work area if a vehicle ground speed decreases below a ground speed threshold and if the first torque level exceeds a minimum threshold (e.g., a first torque threshold or a lower pile detection torque threshold).

In an alternate embodiment, the pile detector 17 or controller 218 may be associated with a vision system or imaging system and color recognition software or pattern recognition software for identifying or confirming the presence or position of a pile of material.

The boom accelerometer 91 comprises one or more accelerometers mounted on the boom or associated with the boom. The boom accelerometer 91 detects or measures an acceleration or deceleration of the boom. The boom acceleration may be used to estimate when the boom approaches or enters into a stalled state, where acceleration approaches zero or falls below a minimum threshold. The controller 218 may use the detected acceleration to trigger the curling of the bucket, upward rotation of the bucket, or other movement of the bucket to relieve stress during digging, for example.

Figure 4:
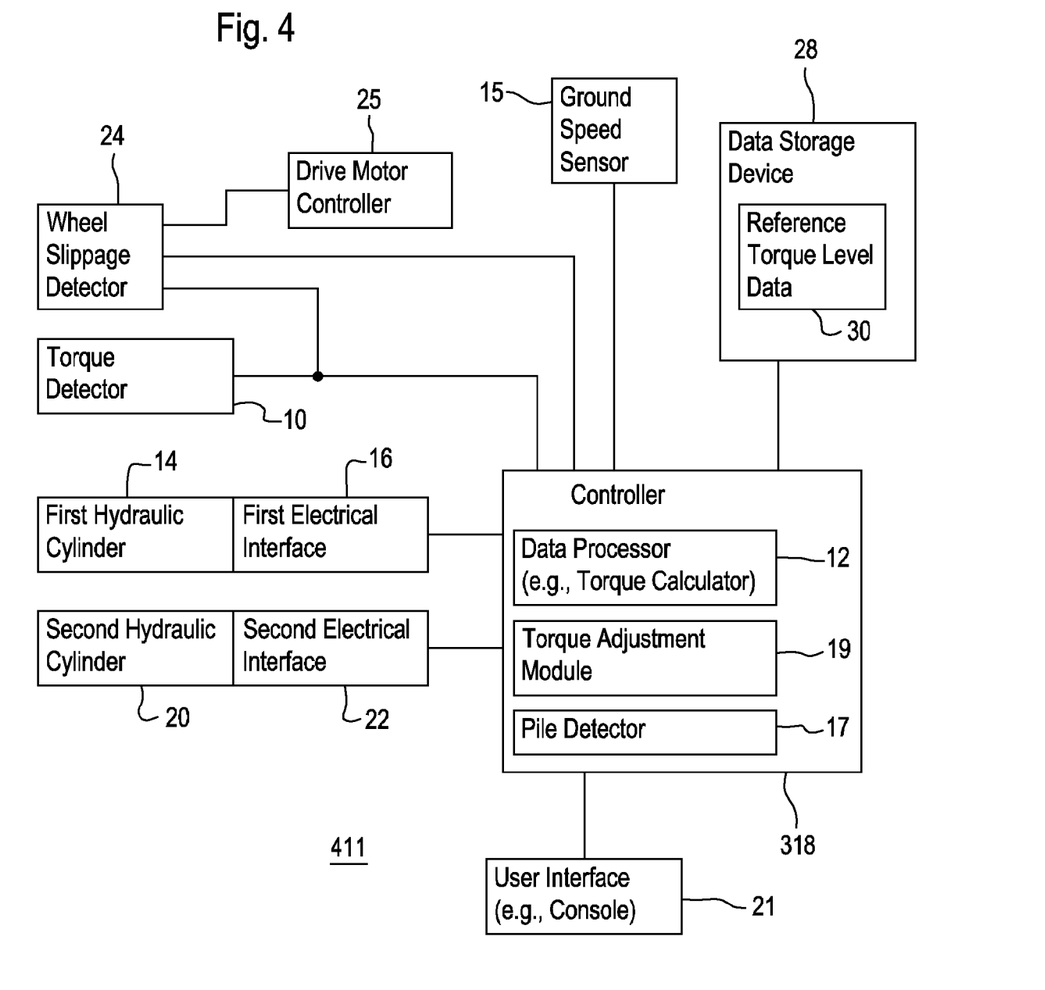
FIG. 4 is a block diagram of a fourth embodiment of a control system for controlling a vehicle for loading or digging.

The control system 311 of FIG. 4 is similar to the system 211 of FIG. 2, except the control system 311 of FIG. 4 further comprises a ground speed sensor 15 and a pile detector 17. Like reference numbers in FIG. 4 and FIG. 2 indicate like elements.

The ground speed sensor 15 may comprise an odometer, a dead-reckoning system, a location-determining receiver (e.g., Global Positioning System receiver), or another device that provides the observed speed or observed velocity of the vehicle with respect to the ground. The ground speed sensor 15 provides observed speed data or observed velocity data to the controller 218.

The controller 318 of FIG. 4 is similar to the controller 118 of FIG. 2, except the controller 318 further includes a pile detector 17. The controller 318 of FIG. 4 comprises a data processor 12 (e.g., torque calculator), a torque adjustment module 19, and a pile detector 17. In one embodiment, the pile detector 17 or controller 318 uses at least inputted ground speed data and observed torque data (e.g., rimpull) to determine whether the vehicle is interacting with or digging into a pile of material. The observed torque data may fall within a digging torque range when the vehicle is digging into a pile of material. Similarly, the observed ground speed data may fall within a digging speed range (e.g., 0-3 miles per hour) when the vehicle is digging into a pile of material. Further, the pile detector 17 or controller 318 may use user input data (e.g., activation of a switch or control after or while an operator visually observed or observes a pile of material), observed ground speed data, and observed torque data to determine whether the vehicle is interacting with or digging into a pile. The pile detector 17 generally detects a pile of material based on user input, the operational status (e.g., inputted ground speed and/or observed torque data) of the vehicle, or both.

In an alternate embodiment, the pile detector 17 may be associated with a vision system or imaging system and color recognition software or pattern recognition software for identifying or verifying the presence or position of a pile of material. The vision system and color recognition software or pattern recognition software is well-suited for use with unmanned vehicles, where an operator may not be available to confirm visually or otherwise verify the presence of a pile of material.

Figure 5:
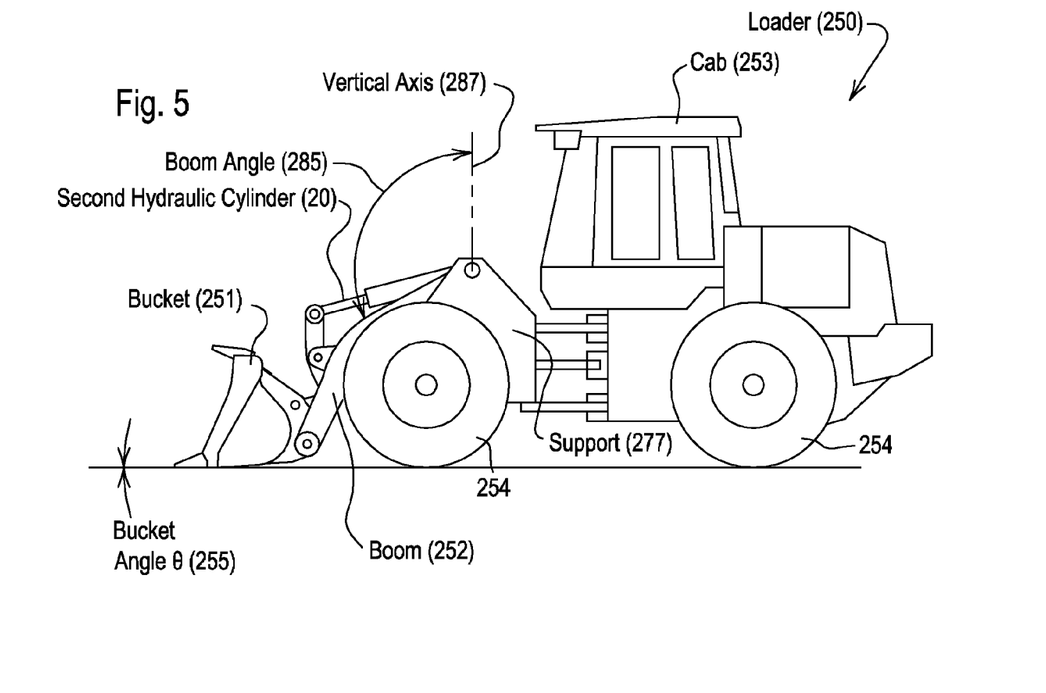
FIG. 5 through FIG. 7 show side views of a vehicle (e.g., loader) in various operational positions.
Figure 6:
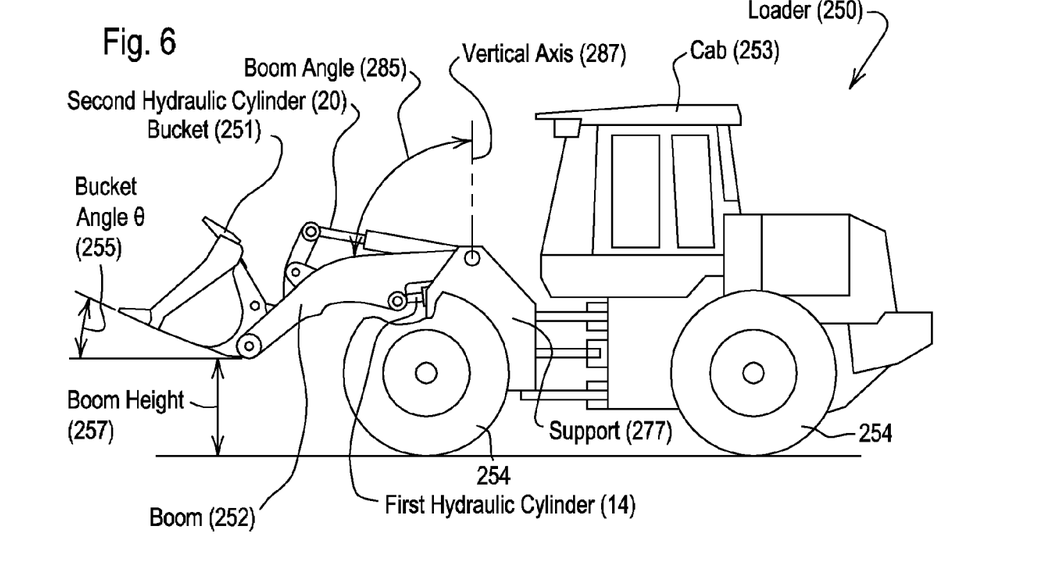
Figure 7:
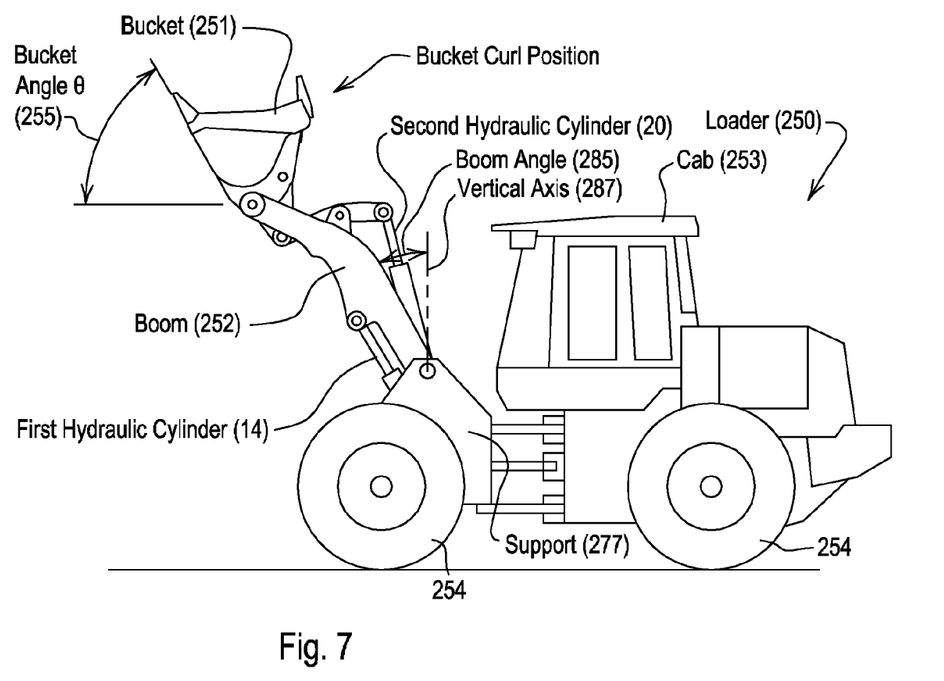

In FIG. 5 through FIG. 7 the work vehicle comprises a loader 250 and the attachment 251 comprises a bucket. Although the loader 250 shown has a cab 253 and wheels 254, the wheels 254 may be replaced by cogwheels (e.g., sprockets) and tracks and the cab 253 may be deleted. One or more wheels 254, or cogwheels and tracks, of the vehicle are propelled by an internal combustion engine, an electric drive motor, or both. The tracks comprise linked members or a belt, which the cogwheels engage for propulsion of the vehicle over ground or another surface. If the vehicle is equipped with tracks, rather than wheels and tires, the vehicle may be referred to as a tracked vehicle or a crawler.

FIG. 5 shows side view of a loader 250 as an illustrative work vehicle, where the loader 250 is in a preliminary position. The preliminary position may represent a position in which digging into a pile of material may be started. The preliminary position is associated with a boom 252 in a lower boom position. The preliminary position or lower boom position may be defined as a boom 252 that has boom height less than a critical height above the ground. Alternatively, the lower boom position may be defined in terms of a boom angle 285 of the boom 252 relative to a support 277 of the vehicle or a vertical reference axis 287. Accordingly, the lower boom position may be associated with a boom angle 285 relative to the vertical reference 287 axis that is greater than a critical boom angle. In the preliminary position of FIG. 5, a bucket angle 255 ($\theta$) with respect to the boom 252 may fall within a range from approximately zero to approximately twenty-five degrees, or any other appropriate range for digging into a pile of material. For example, a bottom of a bucket 251 may be in a generally horizontal position or substantially parallel to the ground, where the bucket angle 255 ($\theta$) happens to approach or approximately equal zero degrees.

FIG. 6 shows side view of a loader 250 as an illustrative work vehicle, where the loader 250 is in a secondary position. The secondary position is characterized by a second boom position or boom height 257 of the boom 252 that is higher than a first boom position associated with the preliminary position. The secondary position is associated with an elevated boom position, which is higher than the lower boom position. The second position or second boom position may be defined as a boom 252 with a boom height that is greater than a critical height above ground. Alternatively, the second boom position or elevated boom position may be defined in terms of a boom angle 285 of the boom 252 relative to a support 277 of the vehicle or a vertical reference axis 287. Accordingly, the second boom position or elevated boom position may be associated with a boom angle 285 relative to the vertical reference 287 axis that is less than (or equal to) a critical boom angle. The bucket angle 255 ($\theta$) associated with the preliminary position and the secondary position may lie within the same general range or another appropriate range for digging into a pile of material.

FIG. 7 shows a side view of a loader 250 as an illustrative work vehicle, where the loader 250 or its bucket 251 and its boom 252 are in a bucket curl position. The bucket curl position typically represents a position of the bucket 251 after the bucket 251 holds, contains, or possesses collected material. In the curl position, the mouth of the bucket is generally facing or tilted upward. The curl position may be made as a terminal portion of a digging process or another maneuver in which the bucket 251 is filled with material. For example, if the boom 252 is in an elevated or raised position, the controller (18, 118, 218, or 318) may trigger the curling of the bucket or similar upward rotation of the bucket in response to the torque detector 10 detecting a second torque level exceeding a second threshold or in response to the boom accelerator detecting an acceleration that falls below a minimum level.

Figure 8:
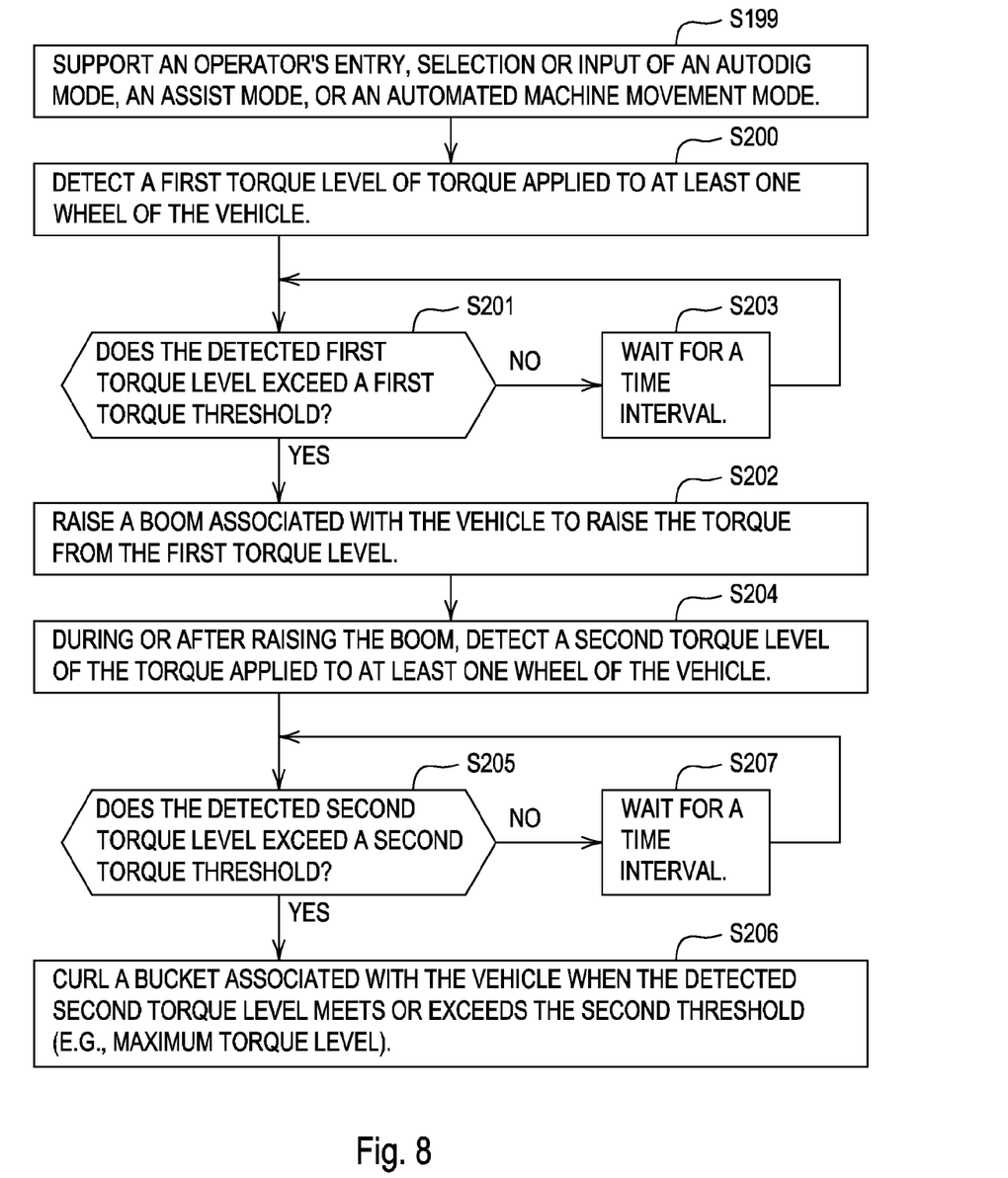
FIG. 8 is a flow chart of one embodiment of a method for controlling a vehicle for loading or digging.

FIG. 8 illustrates a method for controlling a vehicle for digging or loading material. The method of FIG. 8 begins in step S199.

Step S199, a user interface 21 supports an operator's entry, selection, enablement, activation, or input of an auto-dig mode, an assist-mode, or an automated machine movement mode. In an assist-mode, the controller (e.g., 18, 118, 218 or 318) allows an operator to make refinements, adjustments or corrections to automated digging or other operations, or to automate some portion of a digging task or cycle. In either the assist-mode or auto-dig mode, the controller (e.g., 18, 118, 218 or 318) continues machine control or machine movements until interrupted or over-ridden by an operator, either remotely via a tele-operated interface, or in the cab of the vehicle. The automated machine movement mode relates to automated or autonomous movement of the bucket, the boom, or both.

In an alternate embodiment for carrying out step S199, a pile detector 17 or controller (e.g., 18, 118, 218 or 318) may enter an auto-dig-mode, an assist-mode, or an automated machine movement mode of the vehicle (e.g., its boom, or bucket, or both) upon satisfaction of certain criteria (e.g., torque level, operator input, and/or vehicle speed). However, the pile detector 17 or controller may not be enabled to activate or enter into such an auto-dig mode, an assist-mode, or an automated machine movement mode, unless or until an operator enables the auto-dig mode, the assist-mode, or the automated machine movement mode via a command, entry or selection associated with the user interface 21.

In step S200, a torque detector 10 detects a first torque level (e.g., rimpull) of torque applied to at least one wheel of the vehicle (or at least one cogwheel associated with a tracked vehicle). For example, the first torque level may be detected while an attachment or a bucket of the vehicle engages a pile of material or when the vehicle is in a preliminary position with the boom in a first position (e.g., lower position). The detected first torque level (e.g., wheel torque level or cogwheel torque level) or rimpull may be derived or estimated based on a torque measurement (e.g., remote torque level) associated with a shaft of the transmission, drivetrain, torque converter, or otherwise.

In step S201, the controller (18, 118, 218 or 318) or data processor 12 determines if the detected first torque level exceeds a first torque threshold. The first torque threshold refers to or is derived from a first maximum torque level associated with a preliminary position or lower boom position of the vehicle. The lower boom position or preliminary boom position may be defined as a boom height being less than a critical boom height (or a boom angle 285 greater than a critical boom angle with respect to a vertical reference axis 287).

In one embodiment, the first torque threshold may be established based on a first maximum torque level at which the wheels loose traction in the preliminary position or lower position, or skid or slip on the ground. The first maximum torque level may, but need not, be reduced by a safety margin to improve reliability. The first maximum torque level may be established based on a model, an empirical study, a field test, or otherwise.

Under certain models, the first maximum torque level may vary based on one or more of the following factors: the vehicle characteristics, vehicle weight, weight distribution of the vehicle, vehicle suspension configuration, spring constant associated with vehicle suspension or struts, vehicle geometry, tire size, tire tread, tire diameter, tire foot-print, ground characteristics (e.g., compressibility, moisture content), and coefficient of friction between the ground and one or more tires, among other factors. The coefficient of friction depends on the characteristics of various materials that comprise the tires and the ground, such as paved surface, concrete, asphalt, an unpaved, gravel, bare topsoil, bare subsoil, or the like, If the controller (18, 118, 218 or 318) or data processor 12 determines that the detected first torque level exceeds the first threshold, then the method continues with step S202. However, if the controller (18, 118, 218 or 318) or data processor 12 determines that the detected first torque level does not exceed the first threshold, then the method continues with step S203.

In step S202, a user interface 21, a controller (18, 118, 218 or 318) or both raises a boom 252 associated with the vehicle to raise the available torque above the detected first torque level. For example, the controller (18, 118, 218 or 318) may automatically raise the boom (above a lower position or preliminary boom position of FIG. 5) without operator intervention when the first torque reaches a first torque threshold. In one example of carrying out step S202, the controller (18, 118, 218 or 318) raises the boom 252 from the preliminary position to a secondary position to increase the available torque (e.g., rimpull) or reserve torque that can be applied to the wheels (or the cogs and associated tracks) to a torque level that exceeds the first torque threshold. As the vehicle pushes further into a pile of material and encounters a greater level of resistance, more traction is developed by raising the boom to an elevated position or second boom position facilitate filling of the bucket because raising the boom places a downward force or down-weighting on the front wheels or front cogwheels.

The controller (18, 118, 218 or 318) increases an initial rate of upward boom movement associated with the boom 252 to a higher rate of boom movement proportionally to a decrease in the detected ground speed of the vehicle, provided by the ground speed sensor 15, during a time interval.

Under a first technique for executing step S202, the controller (18, 118, 218 or 318) increases an initial rate of upward boom movement associated with the boom 252 to a higher rate of boom movement proportionally to an increase in the detected first torque level during a time interval. The controller (18, 118, 218 or 318) may generate a control signal or command data for the first electrical interface 16 to increase the initial rate of upward boom movement by increasing an opening of a valve associated with the first hydraulic cylinder 14, which is operably connected to the boom 252.

Under a second technique for executing step S202, the controller (18, 118, 218 or 318) increases an initial rate of upward boom movement associated with the boom 252 to a higher rate of boom movement proportionally to a decrease in the detected ground speed of the vehicle, provided by the ground speed sensor 15, during a time interval.

Under a third embodiment, the controller (18, 118, 218 or 318) increases an initial rate of upward boom movement associated with the boom 252 to a higher rate of boom movement proportionally to a combination of an increase in the detected first torque level and a simultaneous decrease in the detected ground speed of the vehicle, provided by the ground speed sensor 15, during a time interval.

Under a fourth embodiment, the controller (18, 118, 218 or 318) raises the boom a predetermined amount commensurate with a height of a detected pile (e.g., based on input from an operator to the user interface 21 or via an imaging system or optical detection system).

Step S202 may be executed in accordance with an auto-dig mode, an assist-mode, or an automated movement mode that is selected, inputted or otherwise directed by an operator via a user interface 21. An assist-mode allows an operator to make refinements, adjustments or corrections to automated digging or other operations. Both the assistance mode and the auto-dig mode continue until interrupted or over-ridden by an operator, either remotely via a tele-operated interface, or in the cab of the vehicle.

In step S203, the controller (18, 118, 218 or 318) or data processor 12 may wait for a time interval, unless a counter exceeds a maximum threshold, where the counter indicates the number of times that step S203 has been executed or repeated.

In step S204, during or after raising the boom to an elevated boom position (e.g., second boom position) the torque detector 10 detects a second torque level of the torque applied to at least one wheel of the vehicle. The second torque level is generally greater than the first torque level.

In step S205, the controller (18, 118, 218 or 318) or data processor 12 determines whether or not the detected second torque level exceeds a second torque threshold. The second torque threshold refers to or is derived from a second maximum level of torque associated with the vehicle in an elevated boom position. The elevated boom position has a boom height greater than or equal to the critical height (or a boom angle 285 less than a critical boom angle with respect to a vertical reference axis 287). The second torque threshold is generally associated with a second maximum torque level at which the wheels loose traction, break away from the ground, skid or slip in the secondary position (e.g., FIG. 6), where the boom is in an elevated boom position or second boom position. If the detected second torque level exceeds a second torque threshold, the method continues with step S206. However, if the second torque level does not exceed the second torque threshold, then the method continues with step S207.

In step S206, user interface 21, the controller 18, or both curls (or upwardly rotates) a bucket associated with the vehicle where the detected second torque level meets or exceeds the second torque threshold (e.g., maximum torque level). For example, the controller (e.g., 18, 118, 218 or 318) may move the bucket into a bucket curl position (e.g., FIG. 7) where the detected second torque level meets or exceeds a second torque threshold (e.g., a maximum torque level). The controller (18, 118, 218 or 318) curls the bucket 251 relative to the boom to reduce the resistance on the bucket 251 from the material. The controller (18, 118, 218 or 318) facilitates an automated digging procedure by maintaining large torque levels or large rimpull values. After an automated digging procedure is completed, the operator may enter one or more commands to move the boom or bucket, or the vehicle to a desired position for dumping the loaded bucket (e.g., into a receptacle).

Step S206 may be executed in accordance with various techniques that may be applied individually or cumulatively. Under a first technique of executing step S206, the controller (18, 118, 218 or 318) increases an initial rate of upward bucket rotation associated with the bucket 252 to a higher rate of bucket rotation proportionally to an increase in the detected second torque level during a time interval. The controller (18,

118, 218 or 318) may generate a control signal or command data for the second electrical interface 22 to increase the initial rate of upward bucket rotation by increasing an opening of a valve associated with the second hydraulic cylinder 20, which is operably connected to the bucket 251, for instance.

Under a second technique of executing step S206, the controller (18, 118, 218 or 318) increases an initial rate of upward bucket rotation associated with the bucket 252 to a higher rate of bucket rotation proportionally to a decrease in the detected ground speed, provided by the ground speed sensor 15, during a time interval.

Under a third technique of executing step S206, the controller (18, 118, 218 or 318) increases an initial rate of upward bucket rotation associated with the bucket 252 to a higher rate of bucket rotation proportionally to a combination of an increase in the detected second torque level and a simultaneous decrease in the detected ground speed, provided by the ground speed sensor 15, during a time interval.

Step S206 may be executed in accordance with an auto-dig mode, an assist-mode, or an automated machine movement mode that is selected, inputted or otherwise directed by an operator via a user interface 21. An assist-mode allows an operator to make refinements, adjustments or corrections to automated digging or other operations, whereas an autodig-mode continues until interrupted or over-ridden by an operator, either remotely via a tele-operated interface, or in the cab of the vehicle.

In step S207, the controller (18, 118, 218 or 318) or data processor 12 may wait for a time interval, unless a counter exceeds a maximum threshold, where the counter indicates the number of times that step S207 has been executed or repeated.

Figure 9:
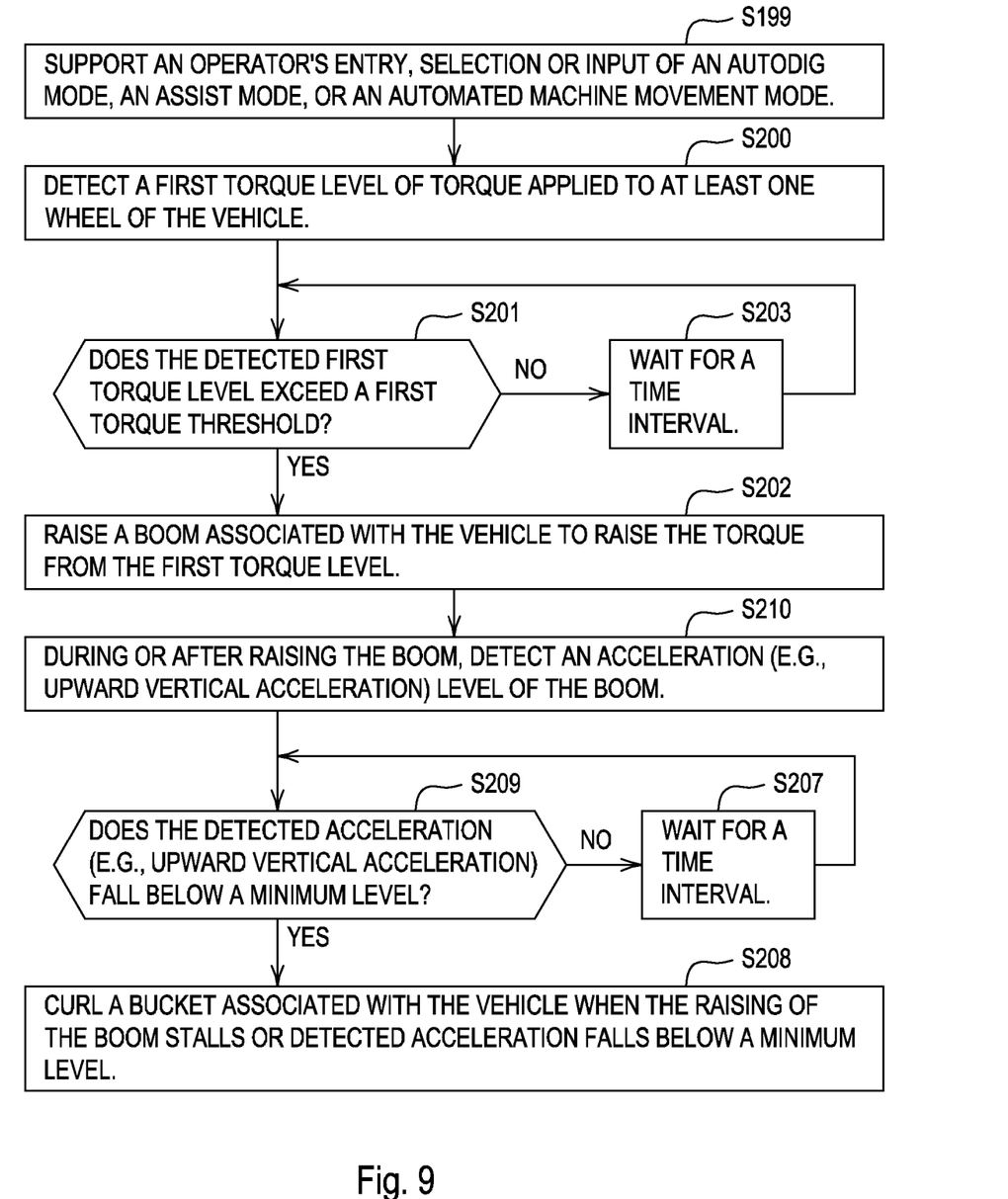
FIG. 9 is a flow chart of another embodiment of a method for controlling a vehicle for loading or digging.

The method of FIG. 9 is similar to the method of FIG. 8, except the method of FIG. 9 further replaces step S204 with step S210 and replaces step S206 with step S208. Like reference numbers in FIG. 8 and FIG. 9 indicate like steps or procedures, and the details of any like steps (e.g., steps S202 and S206) that are more fully described in conjunction with FIG. 8 shall apply equally to FIG. 9 as if fully set forth herein.

Step S199, a user interface 21 supports an operator's entry, selection, enablement, activation, or input of an auto-dig mode, an assist-mode, or an automated machine movement mode. In an assist-mode, the controller (e.g., 18, 118, 218 or 318) allows an operator to make refinements, adjustments or corrections to automated digging or other operations, or to automate some portion of a digging task or cycle. In either the assist-mode or auto-dig mode, the controller (e.g., 18, 118, 218 or 318) continues machine control or machine movements until interrupted or over-ridden by an operator, either remotely via a tele-operated interface, or in the cab of the vehicle. The automated machine movement mode relates to automated or autonomous movement of the bucket, the boom, or both.

In an alternate embodiment for carrying out step S199, a pile detector 17 or controller (e.g., 18, 118, 218 or 318) may enter an auto-dig-mode, an assist-mode, or an automated machine movement mode of the vehicle (e.g., its boom, or bucket, or both) upon satisfaction of certain criteria (e.g., torque level, operator input, and/or vehicle speed). However, the pile detector 17 or controller may not be enabled to activate or enter into such an auto-dig mode, an assist-mode, or an automated machine movement mode, unless or until an operator enables the auto-dig mode, the assist-mode, or the automated machine movement mode via a command, entry or selection associated with the user interface 21.

In step S200, a torque detector 10 detects a first torque level (e.g., rimpull) of torque applied to at least one wheel of the vehicle (or at least one cogwheel associated with a tracked vehicle). For example, the first torque level may be detected while an attachment or a bucket of the vehicle engages a pile of material or when the vehicle is in a preliminary position with the boom in a first position (e.g., lower position). The detected first torque level (e.g., wheel torque level or cogwheel torque level) or rimpull may be derived or estimated based on a torque measurement (e.g., remote torque level) associated with a shaft of the transmission, drivetrain, torque converter, or otherwise.

In step S201, the controller (18, 118, 218 or 318) or data processor 12 determines if the detected first torque level exceeds a first torque threshold. The first torque threshold refers to a first maximum torque level associated with a preliminary position or lower boom position of the vehicle. The lower boom position or preliminary boom position may be defined as a boom height being less than a critical boom height. In one embodiment, the first torque threshold may be established based on a first maximum torque level at which the wheels loose traction in the preliminary position or lower position, or skid or slip on the ground. The first maximum torque level may, but need not, be reduced by a safety margin to improve reliability. The first maximum torque level may be established based on a model, an empirical study, a field test, or otherwise.

Under certain models, the first maximum torque level may vary based on one or more of the following factors: the vehicle characteristics, vehicle weight, weight distribution of the vehicle, vehicle suspension configuration, spring constant associated with vehicle suspension or struts, vehicle geometry, tire size, tire tread, tire diameter, tire foot-print, ground characteristics (e.g., compressibility, moisture content), and coefficient of friction between the ground and one or more tires, among other factors. The coefficient of friction depends on the characteristics of various materials that comprise the tires and the ground, such as paved surface, concrete, asphalt, an unpaved, gravel, bare topsoil, bare subsoil, or the like, If the controller (18, 118, 218 or 318) or data processor 12 determines that the detected first torque level exceeds the first threshold, then the method continues with step S202. However, if the controller (18, 118, 218 or 318) or data processor 12 determines that the detected first torque level does not exceed the first threshold, then the method continues with step S203.

In step S202, a user interface 21, a controller (18, 118, 218 or 318) or both raises a boom 252 associated with the vehicle to raise the available torque above the detected first torque level. For example, the controller (18, 118, 218 or 318) may automatically raise the boom (above a lower position or preliminary boom position of FIG. 5) without operator intervention when the first torque reaches a first torque threshold. In one example of carrying out step S202, the controller (18, 118, 218 or 318) raises the boom 252 from the preliminary position to a secondary position to increase the available torque (e.g., rimpull) or reserve torque that can be applied to the wheels (or the cogs and associated tracks) to a torque level that exceeds the first torque threshold. As the vehicle pushes further into a pile of material and encounters a greater level of resistance, more traction is developed by raising the boom to an elevated position or second boom position facilitate filling of the bucket because raising the boom places a downward force or down-weighting on the front wheels or front cog-wheels.

Step S202 may be executed in accordance with an auto-dig mode, an assist-mode, or an automated movement mode that is selected, inputted or otherwise directed by an operator via a user interface 21. An assist-mode allows an operator to make refinements, adjustments or corrections to automated digging or other operations. Both the assistance mode and the auto-dig mode continue until interrupted or over-ridden by an operator, either remotely via a tele-operated interface, or in the cab of the vehicle.

In step S203, the controller (18, 118, 218 or 318) or data processor 12 may wait for a time interval, unless a counter exceeds a maximum threshold, where the counter indicates the number of times that step S203 has been executed or repeated.

In step S210, a boom accelerometer 91 or another device for sensing acceleration of the boom detects an acceleration (e.g., upward vertical acceleration) or deceleration of the boom 252. The detected acceleration or deceleration (e.g., upward vertical acceleration) of the boom during a digging operation may provide an indication that the boom 252 and its associated first hydraulic cylinder 14 are in a stalled state or approaching a stalled state, where increased hydraulic pressure within a hydraulic chamber associated with the first hydraulic cylinder 14 no longer results in a corresponding material upward movement of the boom. The detected acceleration or deceleration of the boom 252 may provide an indication that the boom system and its associated first hydraulic cylinder 14 are approaching a maximum lifting capacity or stalling capacity of the boom, less any applicable safety margin.

In step S209, the controller (18, 118, 218 or 318) or data processor 12 determines if the detected acceleration (e.g., upward vertical acceleration) falls below a minimum level (e.g., approaching or approximately equaling zero acceleration), where the boom 252 is in an elevated position (e.g., second boom position) and where the bucket 251 is loaded with material. If the detected acceleration falls below a minimum level or approaches zero, the method continues with step S208. However, if the detected acceleration does not fall below a minimum level (e.g., approaching or approximately equaling zero acceleration), the method continues with step S207.

In step S208, while the boom 252 is in an elevated position and the bucket 251 is loaded, the controller (18, 118, 218 or 318) curls or upwardly rotates a bucket 251 (e.g., a loaded bucket) associated with the vehicle when raising of the boom 252 stalls or acceleration falls below the minimum level. For example, the controller (18, 118, 218 or 318) may curl or upwardly rotate the bucket 251 automatically, essentially momentarily over-riding the operator's input to the user interface 21, as the operator is digging into the pile and the boom stalls 252 in its upward trajectory. In one embodiment, stalling may be influenced by the capacity of the hydraulic system (e.g., first hydraulic cylinder 14), the density of the material in the pile, the length of the boom, and the volume or size of the bucket, among other things.

In step S207, the controller (18, 118, 218 or 318) or data processor 12 may wait for a time interval, unless a counter exceeds a maximum threshold, where the counter indicates the number of times that step S207 has been executed or repeated.

Figure 10:
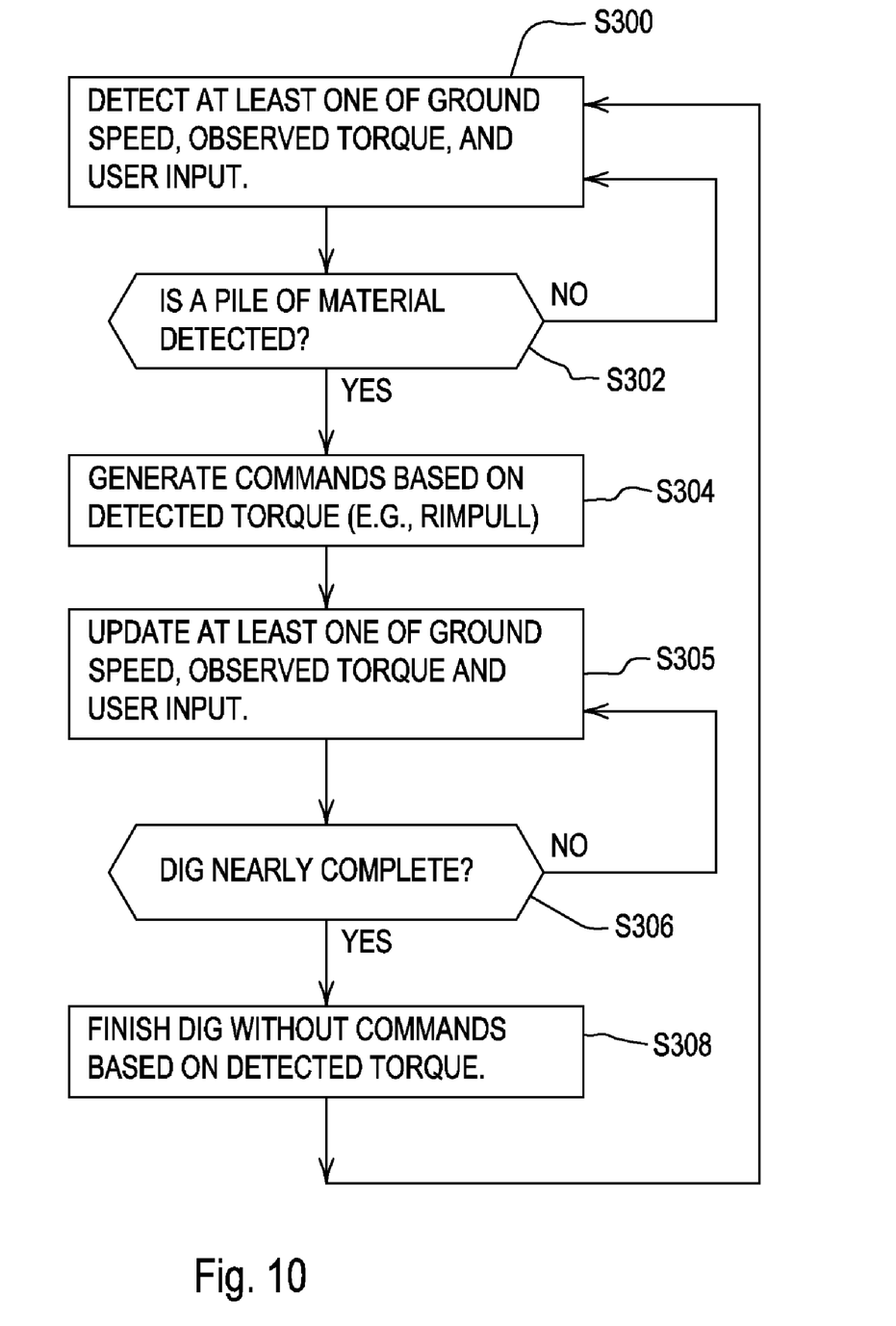
FIG. 10 is a flow chart of yet another embodiment of a method for controlling a vehicle for loading or digging.

FIG. 10 illustrates a method for controlling a vehicle for digging or loading material. The method of FIG. 10 begins in step S300.

In step S300, the ground speed detector 15 detects a ground speed of the vehicle; the torque detector 10 detects, directly or indirectly, an observed torque level associated with at least one wheel of the vehicle; and a user interface 21 accepts input from a user regarding whether or not automated digging, assist mode, torque management, or automated machine motion is applied. The user input may be entered into the user interface 21 to establish one or more of the following: (1) whether or not the pile detector 17 or controller 18 is actually looking for a pile of material, (2) whether or not an automated dig mode, assist mode, or automated machine movement mode is activate or inactive, (3) whether or not an operator visually observes or visually observed a pile of material in the vicinity of the vehicle.

In step, S302, a pile detector 17 or controller 18 detects a pile of material based on at least two of the detected ground speed, the observed torque level, and the user input based on a totality of the circumstances analysis, compliance with established logical rules, or otherwise. If the observed first torque level (e.g., instantaneous rimpull) associated with at least one wheel exceeds a minimum threshold (e.g., first torque level) and if an auto-dig mode, assist mode, or automated machine movement mode is active, the controller 18 may generate a control signal or status data indicating a pile of material has been detected. Similarly, if the filtered, observed first torque level (e.g., average rimpull) exceeds the minimum threshold, and if the auto-dig mode, assist mode, or automated machine motion mode is active, the controller 18 may generate a control signal or status data indicating that a pile of material has been detected. If a pile of material is detected or if an operator commands (e.g., overriding or substituting for the detection of a pile of material) the vehicle to enter an auto-dig mode, assist mode, or automated machine movement mode via the user interface 21, the method continues with step S304. However, if a pile of material is not detected, the method continues with step S300.

By considering the first torque level (e.g., rimpull) in the pile detection procedure of step S302, the pile detector 17 or controller 18 facilities more reliable detection of piles of material or obstacles (e.g., brick wall). For example, the more reliable detection may include disregarding false positive indications of piles that might otherwise be caused by bumpy terrain or spikes in hydraulic pressure in the hydraulic system.

In step S304, the controller 18 generates one or more commands based on the detected torque (e.g., rimpull). The generated commands may be used to control the position or motion (e.g., acceleration or velocity) of the bucket, the boom, or both in response to the detected torque (e.g., rimpull). Step S304 may be carried out in accordance with various techniques, which may be applied alternately and cumulatively. Under a first technique, the boom, the bucket, or both are activated or moved as a function of the observed first torque (e.g., rimpull). Under a second technique, the boom, the bucket, or both are activated or moved as a function of the observed first torque and vehicle speed or velocity. Under a third technique, as the vehicle speed or magnitude of the vehicle velocity increases, the boom and bucket command signals are increased in magnitude on a proportional or commensurate basis.

In step S305, the ground speed detector 15 updates a ground speed of the vehicle, the torque detector 10 updates an observed torque level associated with at least one wheel of the vehicle, and a user interface 21 updates input or accepts input from a user regarding whether or not automated digging mode, assist mode, automated motion mode, or torque management should continue to apply.

In step S306, the controller 18 or pile detector 17 determines if a dig is nearly complete or if a pile is materially diminished in size. For example, of the bucket or the boom approaches a boundary of a dig space, the controller 18 may flag, note or transition the vehicle into a finish dig state. In one example, the boundary of the dig space is reached when either the bucket is almost fully racked back (e.g., by the operator to collect, remove, or scrape the remaining material on the pile with the bucket) or the boom height exceeds a certain height level (e.g., meeting or exceeding the maximum desirable transport height of the boom).

In step S308, the controller 18, the user interface 21 or both support completion of the digging or moving of material without commands based on the detected torque level. In step S308, which may be referred to as the finish dig state, the controller 18 may issue commands (e.g., large commands) to a hydraulic cylinder associated with the bucket to move (e.g., snap material back in to the back of the bucket.) After step S208, the algorithm may return to step S300 again.

The embodiments of the control system and method disclosed herein are well suited for reliable control and automated control of a vehicle, or its boom, or bucket for digging or other operations over an extended temperature range. The torque detector 10 detects the torque level (e.g., first torque level or rimpull) that is generally independent of the temperature of the vehicle or ambient temperature to provide reliable control signals. Further, by using torque level (e.g., rimpull) to assist or automate digging and other operations, a novice or inexperienced operator may achieve better efficiency over a lower number of operating hours than otherwise possible. The control system facilitates consistent performance regardless of the variations in the density of the pile of material.

Having described the preferred embodiment, it will become apparent that various modifications can be made without departing from the scope of the invention as defined in the accompanying claims.

The invention claimed is:

1. A method for controlling a vehicle for a loading or digging operation, the method comprising:
    detecting a first torque level of torque applied to at least one wheel of the vehicle, the first torque level associated with a lower boom position of a boom associated with the vehicle;
    raising the boom from the lower boom position to raise an available torque from the first torque level if the first torque level exceeds a first torque threshold;
    detecting a second torque level of the torque applied to at least one wheel vehicle during or after the raising of the boom, the second torque level being greater than the first torque level;
    upwardly rotating or curling a bucket associated with the boom when the detected second torque level meets or exceeds a second torque threshold; and
    adjusting the first torque level or the second torque level in response to detected wheel slippage.

2. The method according to claim 1 further comprising:
    establishing the first torque threshold based on a first maximum level of torque associated with the vehicle in the lower boom position; and
    establishing the second torque threshold based on a second maximum level of torque associated with the vehicle in an elevated boom position.

3. The method according to claim 1 wherein the raising of the boom comprises:
    increasing an initial rate of upward boom movement associated with the boom to a higher rate of boom movement proportionally to an increase in the detected first torque level during a time interval.

4. The method according to claim 3 wherein increasing the initial rate of upward boom movement comprises generating a signal or data command to increase an opening of a valve associated with a hydraulic cylinder operably connected to the boom.

5. The method according to claim 1 wherein the upward rotation of the bucket comprises:
    increasing an initial rate of upward rotation associated with the bucket to a higher rate of bucket rotation proportionally to an increase in the detected second torque level during a time interval.

6. The method according to claim 5 wherein increasing the initial rate of upward rotation comprises generating a data signal or command to increase an opening of a valve associated with a hydraulic cylinder operably connected to the bucket.

7. The method according to claim 1 further comprising:
    determining that a pile of material is considered potentially present in a work area if a vehicle speed relative to the ground decreases below a speed threshold and if the first torque level exceeds a minimum threshold.

8. The method according to claim 1 wherein detecting the first torque level of torque comprises estimating the first torque level based on a shaft rotational speed of at least one of a transmission, a torque converter, a drive train, a motor, and an engine.

9. The method according to claim 1 wherein the raising of the boom comprises increasing an initial rate of upward boom movement associated with the boom to a higher rate of boom movement proportionally to a decrease in a detected ground speed of the vehicle during a time interval.

10. The method according to claim 1 wherein the upward rotation or the curling of the bucket comprises increasing an initial rate of upward bucket rotation associated with the bucket to a higher rate of bucket rotation proportionally to a decrease in a detected ground speed of the vehicle during a time interval.

11. The method according to claim 1 wherein the at least one wheel comprises a cogwheel associated with a track of linked members or a belt, and wherein the vehicle comprises a tracked vehicle or crawler.

12. A system for controlling a vehicle, the system comprising:
    a torque detector for detecting a first torque level and a second torque level of torque applied to at least one wheel of the vehicle, the first torque level associated with a lower boom position of a boom associated with the vehicle, the second torque level associated with an elevated boom position higher than the lower boom position;
    an accelerometer for detecting an acceleration level of the boom during or after raising the boom;
    a first hydraulic cylinder for raising the boom from the lower boom position to raise an available torque from the first torque level;
    a second hydraulic cylinder for upwardly rotating a bucket associated with the vehicle; and
    a controller for sending first control data or a first control signal for controlling the first hydraulic cylinder to raise the boom if the first torque level exceeds a first torque threshold and for sending second control data or a second control signal for controlling the second hydraulic cylinder to upwardly rotate the bucket if the detected acceleration level of the boom is less than a minimum level during an attempt to raise the boom.

13. The system according to claim 12 wherein the first torque threshold is based on a first maximum level of torque associated with the vehicle in the lower boom position.

14. The system according to claim 12 wherein the controller is arranged to increase an initial rate of upward boom movement associated with the boom to a higher rate of boom movement proportionally to an increase in the detected first torque level during a time interval.

15. The system according to claim 14 wherein the controller generates the first control signal or first control data to increase an opening of a valve associated with the first hydraulic cylinder.

16. The system according to claim 12 further comprising:
a ground speed sensor associated with the vehicle for measuring a ground speed of the vehicle; and
a pile detector for determining that a pile of material is considered potentially present in a work area if the measured ground speed decreases below a ground speed threshold and if the first torque level exceeds a minimum threshold.

17. The system according to claim 16 wherein the controller is arranged to increase an initial rate of upward boom movement associated with the boom to a higher rate of boom movement proportionally to a decrease in the ground speed of the vehicle during a time interval.

18. The system according to claim 16 wherein the controller is arranged to increase an initial rate of upward bucket rotation associated with the bucket to a higher rate of bucket rotation proportionally to a decrease in the ground speed of the vehicle during a time interval.

19. The system according to claim 12 wherein the torque detector detects a first torque level based on a shaft rotational speed of at least one of a transmission, a torque converter, a drive train, a motor, and an engine.

20. The system according to claim 12 further comprising:
a plurality of tracks of linked members; and
a plurality of cogwheels as the at least one wheel, the cogwheels engaging the linked members, the vehicle regarded as a tracked vehicle.

21. The system according to claim 12 further comprising a vision system associated with the controller for identifying the presence of a pile of material.

22. The system according to claim 12 further comprising a wheel slippage detector and a torque adjustment module, each in communication with the controller.

* * * * *